April 4, 1961 W. B. SMITH ET AL 2,977,658
CORES FOR MANUFACTURE OF PRECAST SLABS
Filed July 21, 1958 2 Sheets-Sheet 1

INVENTORS
Warner B. Smith
BY Claude Baber

Robert L. Kahn
Attorney

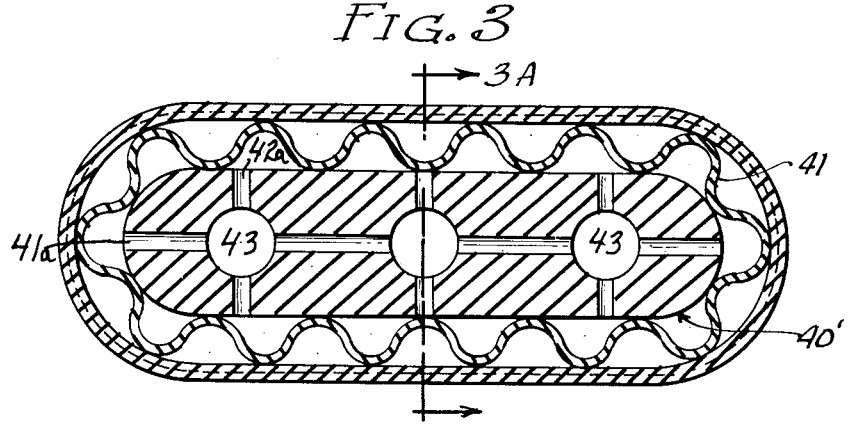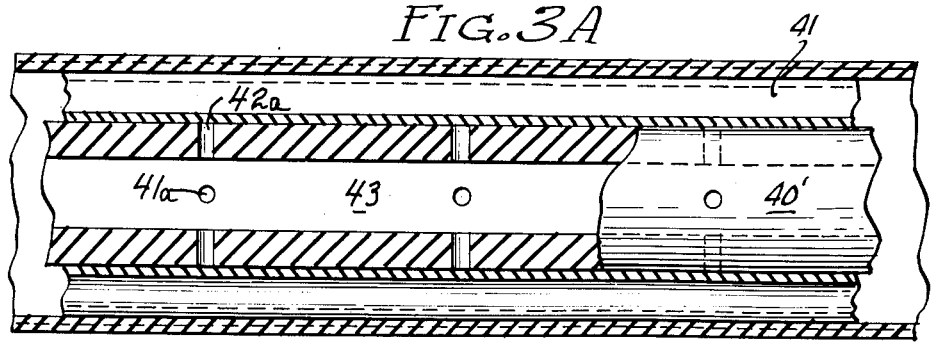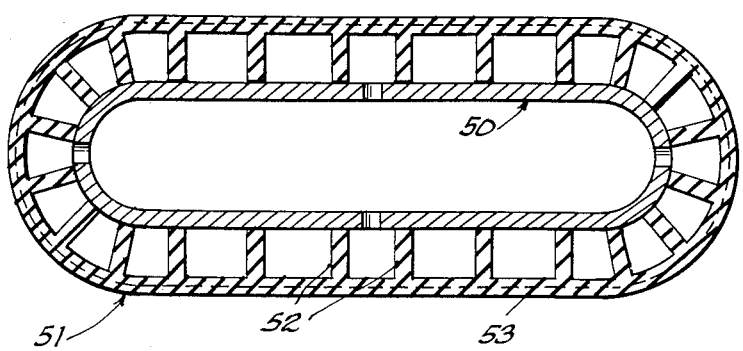

United States Patent Office 2,977,658
Patented Apr. 4, 1961

2,977,658

CORES FOR MANUFACTURE OF PRECAST SLABS

Warner B. Smith, Medway, and Claude Baber, Kettering, Ohio, assignors to The Flexicore Co., Inc., Dayton, Ohio, a corporation of New York Filed July 21, 1958, Ser. No. 749,955

6 Claims. (Cl. 25—128)

This invention relates to cores for use in the manufacture of precast slabs of concrete provided with longitudinal passages therethrough having any desired cross-sectional shape whether it be circular or non-circular.

In the manufacture of precast slabs, a mold having a generally U-shaped section is used. Bulkheads at suitable places along the length of the mold are provided for determining the ends of the slabs. In order to provide passages through the slabs, a removable core member of suitable shape is used.

In accordance with the present invention, generally self-supporting cores are provided having skeletons of stiff material. Disposed over such skeletons are bodies having substantial flexibility. Constructions embodying the present invention are provided with means whereby deflation of the bodies around the skeleton permits separation of the core from the concrete.

This feature is important for the reason that the length of the core is quite great in comparison to the cross-sectional dimensions. Consequently, unless means are provided for effecting a separation between the outer surface of the core and the concrete, removal of the core may be rendered extremely difficult if not impossible. Inflation of the core may be utilized if desired.

The invention may assume a number of variations some of which will be described in connection with the drawings.

Referring therefore to the drawings,

Figure 3 shows a still further modification.

Figure 3A is a section on line 3A of Figure 3.

Figure 4 shows a still further modification.

Figure 1:
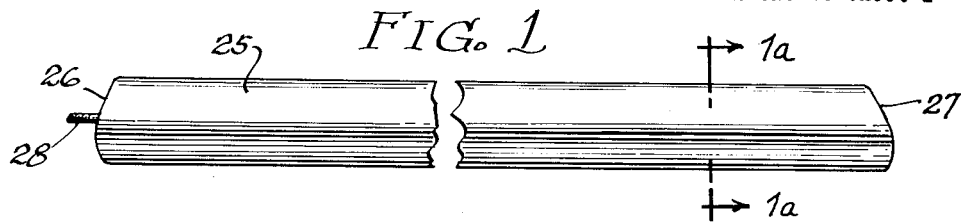
Figure 1 shows a core for providing a non-circular passage through a precast slab.
Figure 1A:
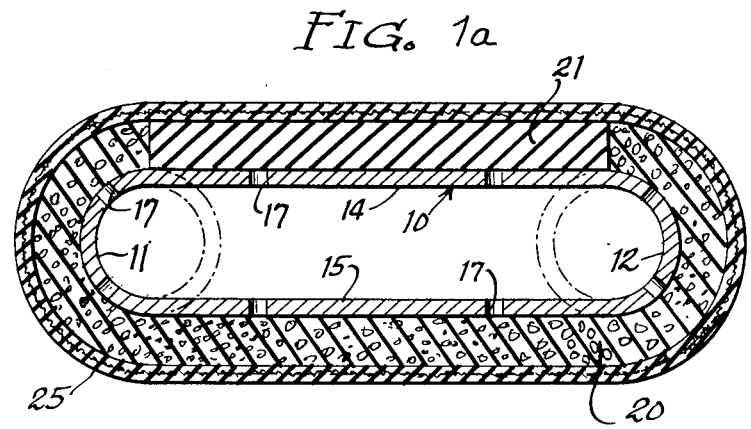
Figure 1a is a section on line 1a—1a of Figure 1.

Referring now to Figures 1 and 1a, there is provided an elongated flattened skeleton 10, of rigid material. Skeleton 10 has a generally tubular shape and constitutes the innermost support for the core. All other core portions are outside of skeleton 10. Skeleton 10 may be made of metal, such as aluminum, or wood. Skeleton 10 will have to be as long as the longest slab to be cast. Since some slabs come in lengths of 30 feet, it will be apparent that skeleton 10 will have substantial length. Incomparison to the length, the transverse dimensions of skeleton 10 are relatively small. Thus, as an example, skeleton 10 may have inside transverse dimensions as small as 2 inches by 6 inches. These dimensions are not critical and are merely given to illustrate the relatively small cross-section of the core.

A simple way of fabricating skeleton 10 consists in welding two lengths of pipe to a pair of metal strips. Thus, portion 11 of the skeleton may be originally part of a length of pipe. The same is true of portion 12 of the skeleton. Flat metal sheets 14 and 15 are used to form the opposing sides.

As illustrated here, portions 11 and 12 are semi-circular. The pipe length from which part 11 may be originally provided may either be cut in half to leave portion 11 or the inside part of the pipe shown in dotted lines may be left intact.

If the core is to be used to provide passages having a circular cross-section, then skeleton 10 may consist of a length of round pipe.

The metal used should be thick enough to have substantial strength. Thus, in the case of aluminum the metal may have a thickness of about ⅛ of an inch or more. Instead of aluminum, it is possible to use steel. In such case, the thickness may be reduced. Skeleton 10 is provided with numerous apertures 17 through the walls thereof to provide ready access of air between the exterior and interior of skeleton 10.

Disposed around skeleton 10 is body 20 of generally porous resilient material. Body 20 may consist of foam rubber, polyurethane, or any other material having a generally spongy construction and capable of expanding under air pressure and contracting under vacuum.

Body 20 includes portion 21 adjacent side wall 14 of the skeleton. Body portion 21 is preferably stiffer and mechanically stronger than the rest of body 20 and may consist of rubber or plastic having a substantial degree of hardness. For example, body 20 may be similar to the material used in mattresses or bed cushions. Body portion 21 may be generally similar to the rubber used in the shoe of an automobile tire and has substantial stiffness. Body portion 21 may be omitted, with portion 20 filling this space. It is also possible to have alternate strips of material 20 and 21 around skeleton 10.

Covering the entire body is skin 25 of flexible, tough, air-tight material such as rubberized fabric, plastic material used in automobile upholstery, rayon, nylon, or the like. The skin is preferably finished to provide a smooth glossy surface to which concrete will not ordinarily adhere and which will slip past concrete easily.

The ends of the entire structure are sealed by end walls 26 and 27. These end walls may be of the same material as skin 25 and should be tough and heavy enough to withstand wear. Air valve 28 is secured in at least one of the end walls and permits of the introduction or exhausting of air. Air valve 28 is preferably in that part of the end wall that will permit air to be introduced directly into the interior region of skeleton 10. This permits rapid diffusion of air to the entire core body.

The construction shown in Figure 1 is adapted to be used with generally stiff body portion 21 disposed on top, the entire core being horizontal. This construction makes it possible to press the top of the core downwardly into a form and prevents the core from rising within the mass of concrete mix.

During casting, air valve 28 is closed, the core containing air at atmospheric pressure or at some small pressure above atmosphere, such as 1 or 2 pounds per square inch. After the concrete has set, valve 28 is opened and suction is applied to the valve. The suction which may be about 5 or 10 pounds per square inch tends to deflate skin 25 and body 20 against skeleton 10. The amount of movement of skin 25 away from the concrete need not be great and in fact a movement of as little as ⅛ of an inch may suffice. Since the entire bottom and sides of the core will tend to pull away from the interior of the slab channel, a pull upon the core will suffice to free the top of the core from the concrete. It is understood that the core will have to be pulled straight out from the finished slab. In most cases it will be desirable to pull the core out while the slab is still in the mold between the bulkheads.

The application of a thin coating of oil or a greasy material like bentonite to the skin of the core prior to casting may generally facilitate disengagement of the skin from the concrete.

Figure 2:
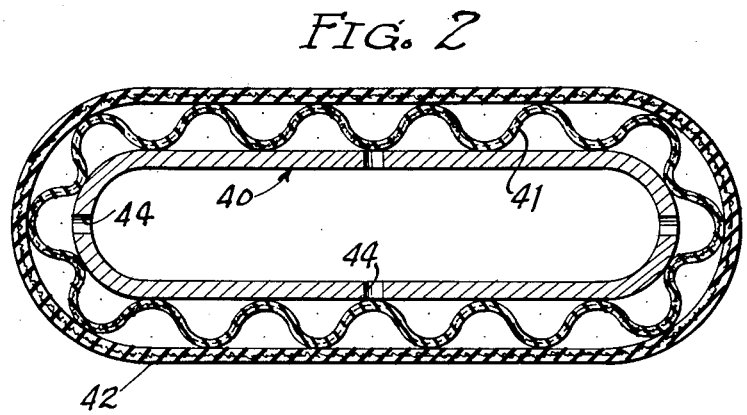
Figure 2 shows a modification of the core.

Referring now to Figure 2, skeleton 40 is generally similar in construction to skeleton 10 of Figure 1. Skeleton 40 has disposed around it a body consisting of corrugated strip 41 of rubber or spring metal. Disposed outside of corrugated strip 41 is air-tight skin or membrane 42 which may resemble skin 25 of Figure 1. Skeleton 40 is provided with numerous air passages 44 to permit air to pass freely from one side to the other of the metal skeleton.

Ordinarly, corrugated member 41 will have sufficient spring to distend skin 42. If desired, air under pressure may be provided within the core to insure that skin 42 will be taut. It is understood that at least one end wall will have a fitting for air as in Figure 1.

After the concrete has set, the application of vacuum to the valve for this core will cause membrane 42 to shrink toward the skeleton and free the core from the concrete.

Referring now to Figures 3 and 3A, this construction is generally similar to that illustrated in Figure 2 with the exception that a rubber skeleton 40' is used. Skeleton 40' is provided with transverse passages 41a and 42a and longitudinal passages 43 at spaced intervals for the purpose of reducing weight. Preferably the rubber skeleton is designed to be quite rigid transversely and quite flexible longitudinally. If desired stiffening rods of metal may be inserted transversely of the core. However, in general this modification may be used in the same manner as the modification disclosed in Figure 2. Skeleton 40' of Figure 3 may also be used instead of skeleton 10 of Figure 1.

Referring now to Figure 4, a further modification is illustrated wherein skeleton 50 is provided with rubber or plastic body 51 having fingers or ribs 52 extending inwardly from body 51. Fingers or ribs 52 extending inwardly serve to space body 51 from skeleton 50. It is understood that the outside of body 51 is covered with an air-tight skin 53 similar to the skin in Figure 1. The finger construction imparts a desirable shape to the body when the core is in normal condition. The fingers also prevent the skin from wrinkling excessively when vacuum is applied. When air under pressure is introduced into the core the plastic body 51 is distended and fingers 52 clear skeleton 50 enough to permit air to equalize in the core.

While a number of modifications of the invention have been illustrated, it is understood that additional variations are possible. For one thing, the cross-sectional shape of a core need not be symmetrical. The core may be used for providing passages having circular cross-section. In all cases, the core will include an interior skeleton of rigid or semi-rigid material, an air-tight skin enclosing the skeleton, and some solid means between skeleton and skin for at least partially retaining the skin spaced from the skeleton and in partially if not completely stretched condition. This will prevent the skin, during deflation, from wrinkling excessively and becoming tangled up. Cores embodying the present invention will in all cases be deflatable for removal from a casting.

What is claimed is:

1. A unitary core for use in casting concrete slabs, said core having a length of the order of magnitude of about 30 feet and transverse dimensions of a lower order, said core comprising a generally stiff skeleton of non-porous material extending the full length of the core, said skeleton having at least one longitudinal passage therethrough with air passages extending laterally therefrom through the walls of said skeleton to permit air to flow from said longitudinal passage within said skeleton to the region around the outside of said skeleton, flexible means disposed around the outer surface of said skeleton along the length thereof, a smooth flexible air-tight skin disposed for the length of said skeleton around the outside of said flexible means, said flexible means having sufficient body and extending between the opposed skin and skeleton surfaces and normally distending said skin and providing a substantial separation between said skin and skeleton, said flexible air-tight skin being non-metallic and being readily foldable and substantially non-stretchable and non-compressible under operating conditions, air-tight end walls for said skin to render the entire core structure air-tight, a fitting at least at one end wall for permitting air to pass between the atmosphere and the interior of said core, said core being adapted to have air under at least atmospheric pressure therein during casting, said core under such conditions defining a longitudinal passage in concrete during setting, said core being adapted to have the air within the same exhausted in connection with removal of the core from the casting, said flexible means under suction conditions providing room for said skin to wrinkle and fold and reduce the overall transverse dimensions of the core by at least ⅛ to clear the concerete surface sufficiently to permit ready removal of said core from the casting.

2. The construction according to claim 1 wherein said flexible means includes a corrugated member, said corrugated member normally tending to maintain its corrugated shape but being readily collapsible under conditions when said core is exhausted of at least part of its air content.

3. The construction according to claim 1 wherein said flexible means includes a plurality of flexible fingers.

4. The construction according to claim 1 wherein said flexible means and skin are integral, said flexible means comprising fingers extending from the inside surface of the skin toward said skeleton, said fingers being readily bendable to permit said skin to contract toward said skeleton.

5. A unitary core for use in casting concrete slabs, said core having a length of the order of about 30 feet and transverse dimensions of a lower order, said core comprising a generally stiff skeleton of non-porous material extending the full length of the core, said skeleton having at least one longitudinal passage therethrough with air passages extending laterally therefrom through the walls of said skeleton to permit air to flow from said longitudinal passage within said skeleton to the region around the outside of said skeleton, flexible cellular means disposed around the outer surface of said skeleton along the length thereof, said flexible means being able to breathe air and being responsive to pressures of air as low as about two pounds per square inch for changing the volume thereof, a smooth flexible air-tight skin disposed for the length of said skeleton around the outside of said flexible means, said flexible means having sufficient body and extending between the opposed skin and skeleton surfaces and normally providing a substantial separation between said skin and skeleton, said flexible air-tight skin being non-metallic and being readily foldable and substantially non-stretchable and non-compressible under operating conditions, air-tight end walls for said skin to render the entire core structure air-tight, a fitting at least at one end wall for permitting air to pass between the atmosphere and the interior of said core, said core being adapted to have air under at least atmospheric pressure therein during casting, said core under such conditions defining a longitudinal passage in concrete during setting, said core being adapted to have the air within the same exhausted in connection with removal of the core from the casting, said flexible means contracting under suction conditions and permitting said skin to wrinkle and fold and reduce the overall transverse dimensions of the core by at least ⅛ to clear the concrete surface sufficiently to permit ready removal of said core from the casting.

6. The construction according to claim 5 wherein said skeleton has one side along the length thereof flattened, this flattened side constituting the top of the casting form when the same is normally in use in horizontal position and wherein there is stiff non-porous material between the flattened side of said skeleton and the skin opposite said flattened side.

References Cited in the file of this patent

UNITED STATES PATENTS

| | | |
|---|---|---|
| 1,570,915 | Nose | Jan. 26, 1926 |
| 1,605,782 | Rota | Nov. 2, 1926 |
| 2,052,818 | Freyssinet et al. | Sept. 1, 1936 |
| 2,485,898 | Mathews et al. | Oct. 25, 1949 |
| 2,612,673 | Billner | Oct. 7, 1952 |

FOREIGN PATENTS

| | | |
|---|---|---|
| 554,269 | Great Britain | June 28, 1943 |
| 554,336 | Great Britain | June 29, 1943 |